Dec. 2, 1958   C. C. BROWN   2,862,559
CUP SEAL AND ANCHOR UNIT FOR PIPES
Filed March 9, 1955   2 Sheets-Sheet 1
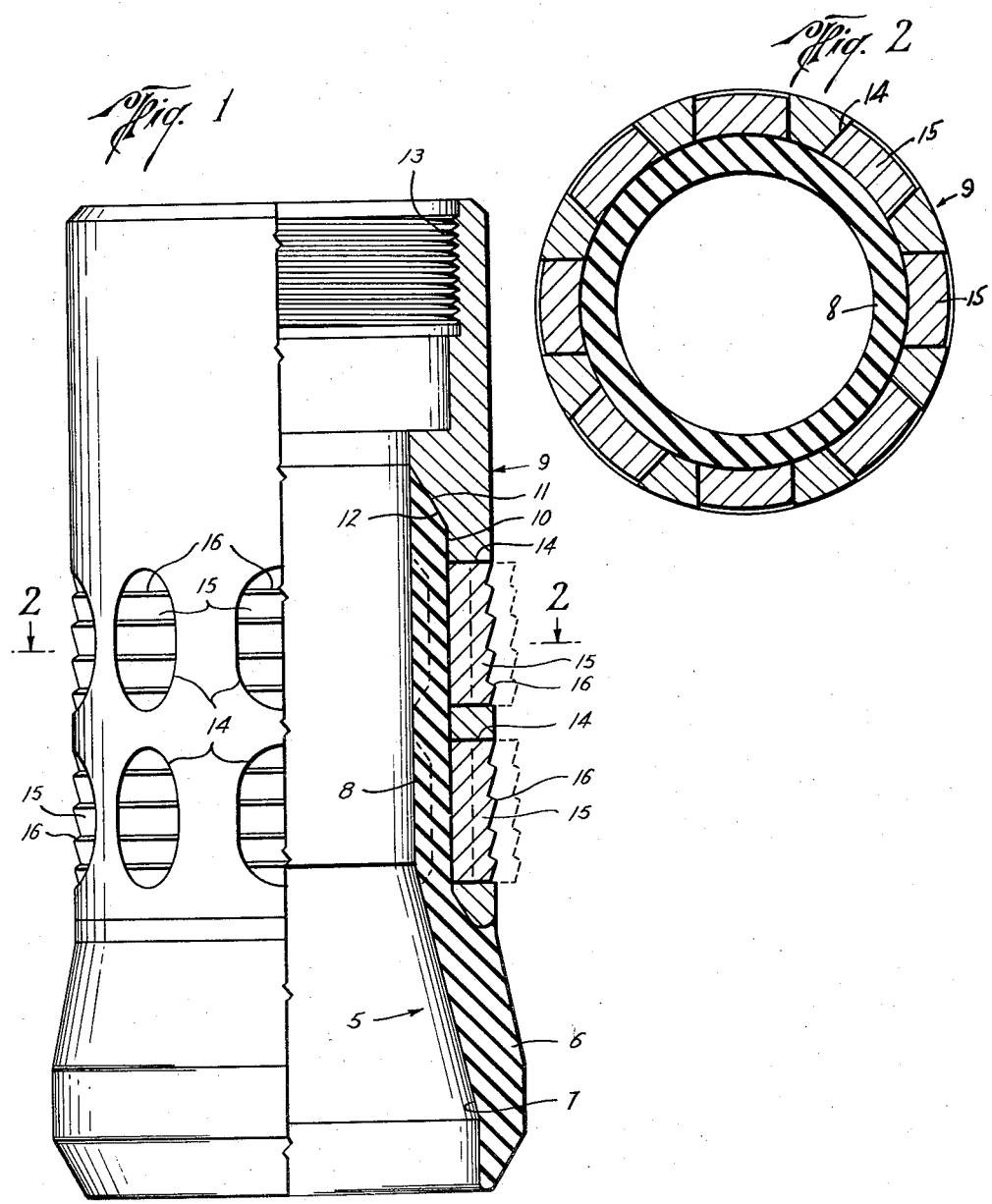
Cicero C. Brown
INVENTOR.
BY
ATTORNEY Dec. 2, 1958   C. C. BROWN   2,862,559
CUP SEAL AND ANCHOR UNIT FOR PIPES
Filed March 9, 1955   2 Sheets-Sheet 2
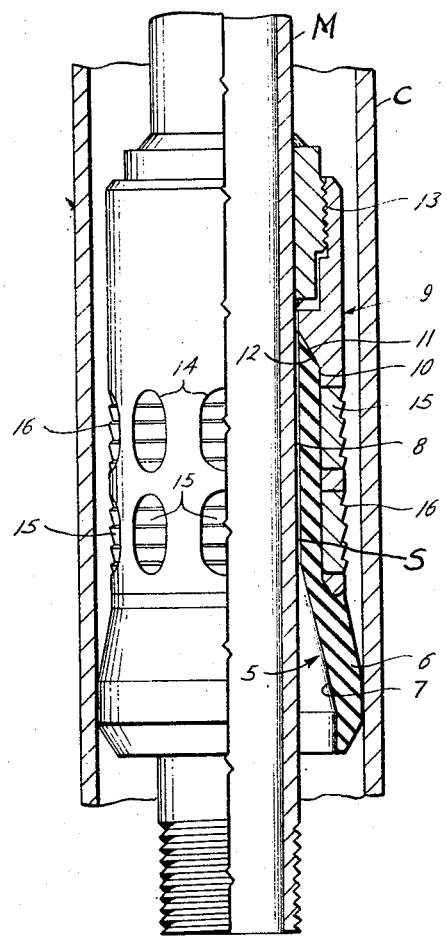
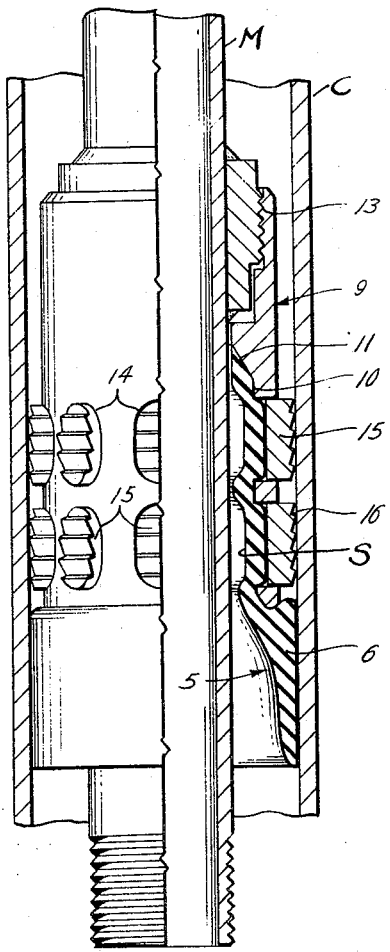
Cicero C. Brown
INVENTOR.
BY
ATTORNEY

United States Patent Office 2,862,559
Patented Dec. 2, 1958

2,862,559

CUP SEAL AND ANCHOR UNIT FOR PIPES

Cicero C. Brown, Houston, Tex.

Application March 9, 1955, Serial No. 493,193

8 Claims. (Cl. 166—121)

This invention relates to a combination seal and anchor unit for use in wells.

In various types of well tools such as packers, bridging plugs, squeeze tools, and the like, sealing elements are ordinarily required to form pressure-tight seals between the tool and the well wall, which will ordinarily be the casing or other pipe lining the well bore. In many instances, the seal elements will comprise the well-known resilient cup seal adapted to be radially expanded by internal pressure to form the required seal. In addition, most of such well tools require some type of anchor member by which the tool may be anchored to the well wall to prevent movement under the fluid pressures encountered in the well. The sealing element and the anchoring element have heretofore been combined in the form of a unitary structure for attachment or incorporation in a well tool. Such a combination unit is disclosed in my copending application Serial No. 403,328, filed January 11, 1954, and the present application is a continuation-in-part of the aforementioned application.

One of the problems encountered in the use of cup seals or other sealing elements, including those having the anchor elements or slips mounted thereon, as in the aforemetioned application, is the difficulty of preventing extrusion of the resilient composition material forming the sealing element through any openings, interstices, or orifices which are initially present in the structures comprising these combination units, or which may be formed during operation of the devices by relative movement of parts thereof. Under the very high pressures frequently encountered in oil and gas wells, plastic flow of the usual elastic compositions forming the seal element will occur and will seek out every such opening, with the result that the seal will often fail under high pressure conditions.

One previous well tool construction, having a combination seal and anchor unit, employs a series of segmental slips circumferentially arranged about the exterior of the sealing element. When in normal position, that is, with the seal contracted, the slip elements will normally be in side edge-to-edge abutting relation. When, however, the seal element is expanded under pressure, the circumferential expansion which accompanies the radial expansion will necessarily produce a separation between the side edges of the slip segments, thereby providing crevices or interstices through which the plastic material, composing the seal element, may be extruded under the internal pressure applied to the seal element. The result will then be leakage through the seal and even destruction of the sealing and anchoring element.

It is, therefore, a primary object of the present invention to provide an improved combination cup seal and anchor unit for use in wells which will obviate or eliminate the difficulties encountered with earlier designs.

In accordance with one embodiment of this invention, the cup-shaped sealing element has a tubular sleeve portion which is enclosed in a metal housing having radial openings therein, in which there are mounted individual slip elements. The slip elements have their inner ends secured directly to the sealing element and are radially movable in the openings in response to the expansion and contraction of the sealing element under internal fluid pressures. The slip segments are formed to provide a close sliding fit in the respective openings, with the result that although free to move into and out of wall-gripping engagement, no crevices or interstices will be formed which are sufficiently large to permit extrusion of the plastic material composing the seal element.

In accordance with one embodiment of the present invention, the enclosing metal housing may be provided with one or more rings of angularly spaced openings, each of relatively small area, and in each of which a slip element is mounted. While the particular shape of the opening and the related slip element is not critical, one preferred embodiment employs openings of oval or ovoid shape and correspondingly shaped slip elements, each unit being provided with a double row of these slip elements, and each row having a number of the slip elements spaced apart about the circumference of the body of the device.

Other and more specific objects and advantages of this invention will become apparent from the following detailed description when read in conjunction with the accompanying drawing, which illustrates a useful embodiment in accordance with the present invention.

In the drawing:

Fig. 1 is a longitudinal quarter-sectional view of a combination cup seal and anchor unit in accordance with this invention;

Fig. 2 is a transverse cross-sectional view along line 2—2 of Fig. 1.

Fig. 3 is a longitudinal sectional view showing the unit mounted on supporting body and inserted in a well casing, the cup seal and anchor elements being shown in their inactive positions; and Fig. 4 is a view similar to Fig. 3 showing the seal and anchor parts in active casing-engaging positions.

Referring to the drawing, a cup seal element, designated generally by the numeral 5, comprises a cup-shaped seal portion 6 of comparatively large external diameter and of generally outwardly flaring configuration having an outwardly tapering bore 7. Cup-shaped portion 6 merges into and is integrally formed with an elongate cylindrical sleeve portion 8. Cup seal element 5 is constructed of any conventional flexible resilient composition material, such as artificial or natural rubber. Ordinarily, this will be one of the oil resistant types of artifical rubber, such as Neoprene. A metallic body, designated by the numeral 9, preferably constructed of steel, of generally tubular shape and having an axial bore 10, surrounds sleeve portion 8 of the seal element and is provided with a tapered internal shoulder 11 adapted to be abutted by correspondingly tapered inner end 12 of sleeve portion 8. Body 9 extends longitudinally along the exterior of the full length of sleeve portion 8 to a point abutting the enlarged diameter of the flared section of the seal element. The end of body 9, opposite the end into which the seal element is inserted, may be threaded internally, as at 13, for connecting the unit to a supporting body or mandrel M (Figs. 3 and 4) which extends through the bore of the unit and may be a part of a well tool, such as a packer, bridging plug, squeeze tool, or the like, which, it will be understood, will ordinarily be equipped with some type of closure (not shown), by which the bore of the mandrel as well as that of the seal unit may be closed against the passage of fluid therethrough. The seal unit will be fixedly secured to body 9, as by vulcanizing sleeve portion 8 directly to the wall of bore 10 of the enclosing body.

Such vulcanizing of rubber composition to metal is conventional practice for providing a strong bond between these materials.

The portion of body 9 surrounding sleeve portion 8 is provided with one or more series (two series are shown) of circumferentially arranged angularly spaced, generally oval-shaped radial openings 14 extending through the wall of the body. While the openings 14 in the illustrative embodiment are generally oval in shape, it will be understood that this shape is not critical but may include square, rectangular, or other suitable shapes. Mounted in each of the openings 14 is a slip element 15 of the same shape as the opening, the slip being dimensioned to have a close radial sliding fit in the opening. The exterior surface of the slip is provided with teeth 16, of any suitable shape, distributed substantially throughout the area of the outer end faces of the slips and adapted when forced outwardly of the opening to bite into and grippingly engage the adjacent well wall which, as shown in Fig. 4, will ordinarily be the well casing C or other metal pipe lining the well bore. In the illustrative embodiment, teeth 16 are shown to be upwardly facing buttress type teeth which would normally be most effective in resisting upward movement of the seal and anchor unit in a well pipe in which it is installed. The inner ends of all of the slip elements will be fixedly secured to sleeve portion 8, ordinarily by vulcanizing which, as noted, forms an extremely strong connection between rubber compositions and metal such as will ordinarily be employed for the slip elements.

From the foregoing description of the structure of the device, it will be seen that when the bore of mandrel M is closed, any fluid pressure trapped below the seal unit will be exerted in the annular space S between the exterior of the mandrel and the seal element against the interior of the latter, with the result that the cup-shaped portion 6 will, of course, be expanded into fluid-tight engagement with the wall of casing C (Fig. 4) and at the same time, the areas of sleeve portion 8, opposite openings 14, will be urged outwardly of the openings and the outward movement, including plastic flow, of the material composing the sleeve portion will urge the slip elements 15 outwardly to the positions indicated generally in dotted lines in Fig. 1 and in full lines in Fig. 4, to force the teeth into gripping engagement with the wall casing C. When the internal pressure is relieved, the resilient material composing sleeve 8 will contract from opening 14, thereby retracting the slip elements inwardly to the initial positions illustrated in full lines in Figs. 1 and 3.

By providing a plurality of separate slip elements of relatively small area individually, as illustrated, and by providing the close sliding fit of these elements in the respective openings, it will be seen that the movement of the slips to their radially extended position will not be accompanied by the formation of any appreciable crevices or interstices between the slip elements and the walls of the openings through which the composition material forming the seal element can be extruded under the internal pressures which may be exerted. Body 9 will, of course, provide support and a confining closure for the balance of sleeve portion 8. The amount of wall-gripping area provided by the slip elements may be varied, depending upon the pressures to be resisted and other operating conditions encountered. Generally, the total combined tooth-carrying area of the slip elements to which the internal pressures are to be applied will be made greater than the cross sectional area of the bore of the seal unit, and preferably from about one to two and one-half times the latter area.

A combination seal and anchor unit of the type described has been found to be exceptionally effective in sealing and anchoring well tools in response to differential pressures across the unit when used in well bores.

It will be understood that a combination seal and anchor unit of the general class described will have many applications for forming anchor seals in tubular conduits, other than those employed in oil and gas wells.

It will be understood that various alternations and modifications may be made in the details of the illustrative embodiment within the scope of the appended claims but without departing from the spirit of the invention.

What I claim and desire to secure by Letters Patent is:

1. A combination seal and anchor unit for use in well pipes, comprising, a tubular metallic body connectible to a well tool for insertion in a well pipe, a seal member constructed of flexible resilient non-metallic material and comprising a cup-shaped seal portion having integrally formed therewith a cylindrically straight tubular sleeve portion, said sleeve portion being inserted in the bore of said body and fixedly secured to the wall thereof, said body having a plurality of angularly spaced radial openings in the wall thereof opposite said sleeve portion, and a pipe-gripping slip mounted in each of said openings, each slip conforming in shape to the opening in which it is mounted and having a close radial sliding fit therein, the outer end faces of said slips carrying pipe-engaging teeth distributed throughout substantially the area of said end faces, the inner ends of the slips being secured directly to said sleeve portion whereby to be movable radially in said openings by the radial expansion and contraction of the sleeve portion in response to fluid pressure interiorly of the seal member.

2. A combination seal and anchor unit as defined by claim 1 wherein the combined tooth-carrying area of the several slips is greater than the cross-sectional area of the bore of said unit.

3. A combination seal and anchor unit as defined by claim 1 wherein said slips are generally ovoid in shape and have a combined tooth-carrying area greater than the cross-sectional area of the bore of said unit.

4. A combination seal and anchor unit as defined by claim 1 wherein the combined tooth-carrying area of the several slips is from one to two and one-half times the cross-sectional area of the bore of said unit.

5. A combination seal and anchor unit for use in well pipes, comprising, a tubular metallic body connectible to a well tool for insertion in a well pipe, a seal member constructed of flexible resilient non-metallic material and comprising a cup-shaped seal portion having integrally formed therewith a cylindrically straight tubular sleeve portion, said sleeve portion being inserted for substantially its full length in the bore of said body and fixedly secured to the wall thereof, said body having two axially spaced circumferential rows of angularly spaced radial openings in the wall thereof opposite said sleeve portion, and a pipe-gripping slip mounted in each of said openings, each slip conforming in shape to the opening in which it is mounted and having a close radial sliding fit therein the outer end faces of said slips carrying pipe-engaging teeth distributed throughout substantially the area of said end faces, the inner ends of the slips being secured directly to said sleeve portion whereby to be movable radially in said openings by the radial expansion and contraction of the sleeve portion in response to fluid pressure interiorly of the seal member.

6. A combination seal and anchor unit as defined by claim 5 wherein the combined tooth-carrying area of the several slips is greater than the cross-sectional area of the bore of said unit.

7. A combination seal and anchor unit for use in a pipe, comprising, a tubular metallic body coaxially insertible in a pipe, a seal member constructed of flexible resilient non-metallic material and comprising a cup-shaped seal portion having integrally formed therewith a cylindrically straight tubular sleeve portion, said sleeve portion being inserted for its full length in the bore of said body and fixedly secured to the wall thereof, said body having a plurality of angularly spaced radial openings in the wall thereof opposite said sleeve portion, and a pipe-gripping slip mounted in each of said openings, each slip conforming in shape to the opening in which it is mounted and having a close radial sliding fit therein, the outer end faces of said slips carrying pipe-engaging teeth distributed substantially throughout the area of said end faces, the inner ends of the slips being secured directly to the sleeve portion whereby to be movable radially in said openings by the radial expansion and contraction of the sleeve portion in response to fluid pressure interiorly of the seal member.

8. A combination seal and anchor unit as defined by claim 7 wherein the combined tooth-carrying area of the several slips is greater than the cross-sectional area of the bore of said unit.

References Cited in the file of this patent

UNITED STATES PATENTS

| | | |
|---|---|---|
| 2,352,700 | Ferris | July 4, 1944 |
| 2,373,005 | Baker | Apr. 3, 1945 |
| 2,603,163 | Nixon | July 15, 1952 |
| 2,691,418 | Connolly | Oct. 12, 1954 |